United States Patent
Wiklund et al.

[19]

[11] Patent Number: 5,817,950
[45] Date of Patent: Oct. 6, 1998

[54] FLOW MEASUREMENT COMPENSATION TECHNIQUE FOR USE WITH AN AVERAGING PITOT TUBE TYPE PRIMARY ELEMENT

[75] Inventors: David E. Wiklund, Eden Prairie; Brian J. Bischoff, Chanhassen, both of Minn.

[73] Assignee: Rosemount Inc., Eden Prairie, Minn.

[21] Appl. No.: 582,905

[22] Filed: Jan. 4, 1996

[51] Int. Cl.$^6$ .................................................. G01F 1/46
[52] U.S. Cl. .......................................................... 73/861.66
[58] Field of Search .......................... 73/861.65, 861.66, 73/861.02, 861.04

[56] References Cited

U.S. PATENT DOCUMENTS

| | | | |
|---|---|---|---|
| 817,470 | 4/1906 | Cole | 73/861.65 |
| 1,093,229 | 4/1914 | Wilkinson | 73/861.65 |
| 1,809,376 | 6/1931 | Cole | 73/861.65 |
| 3,751,982 | 8/1973 | Lambert | 73/861.66 |
| 3,765,241 | 10/1973 | Lambert | 73/861.66 |
| 4,154,100 | 5/1979 | Harbaugh et al. | 73/861.66 |
| 4,320,665 | 3/1982 | Cain | 73/861.04 |
| 4,425,807 | 1/1984 | Victor | 73/861.65 |
| 4,559,835 | 12/1985 | DeBaun | 73/861.66 |
| 4,559,836 | 12/1985 | Coleman et al. | 73/867.66 |
| 4,592,239 | 6/1986 | Cutler | 73/861.66 |
| 4,717,159 | 1/1988 | Alston et al. | 277/1 |
| 4,754,651 | 7/1988 | Shortridge et al. | 73/861.42 |
| 4,768,386 | 9/1988 | Taddeo | 73/861.66 |
| 4,823,615 | 4/1989 | Taha | 73/861.66 |
| 5,313,980 | 5/1994 | Carlson | 137/557 |
| 5,365,795 | 11/1994 | Brower, Jr. | 73/861.65 |
| B1 4,154,100 | 11/1987 | Harbaugh et al. | 73/861.66 |

OTHER PUBLICATIONS

"Fundamentals of Flow Metering," *Technical Data Sheet 3031*, Rosemount Inc. Eden Prairie, MN, 1982, pp. 1–7. (no month provided).
"Generalized Flow Across an Abrupt Enlargement," *Journal of Engineering for Power*, by R.P. Benedict et al., Jul. 1976, pp. 327–334.
"Model 2024 Differential Pressure Transmitter," by Rosemount Inc., Eden Prairie, MN, Sep. 1993, pp. 2–8.
"Model 3051C Differential Pressure Transmitter," by Rosemount Inc., Eden Prairie, MN, 1991, pp. 2–12. (no month provided).
"Pressure Fundamentals & Transmitter Selection," *Application Data Sheet 3015*, by Rosemount Inc., Eden Prairie, MN, pp. 1–10. (no date provided).
"Probe Blockage Effects in Free Jets and Closed Tunnels," *Journal of Engineering for Power*, by J.S. Wyler, Oct. 1975, pp. 509–515.

*Primary Examiner*—Elizabeth L. Dougherty
*Assistant Examiner*—Harshad Patel
*Attorney, Agent, or Firm*—Westman, Champlin & Kelly, P.A.

[57] ABSTRACT

A transmitter in a process control system for measuring flow rate measures total pressure ($P_{TOT}$) and differential pressure (h) of process fluid flowing through a process pipe. The static pressure ($P_{STAT}$) is determined based upon the total pressure ($P_{TOT}$). The calculated static pressure is used to determine the fluid density ($\rho$) and the gas expansion factor ($Y_1$) of the process fluid flowing in the pipe. This information is used to calculate flow rate (Q) of the process fluid.

18 Claims, 6 Drawing Sheets

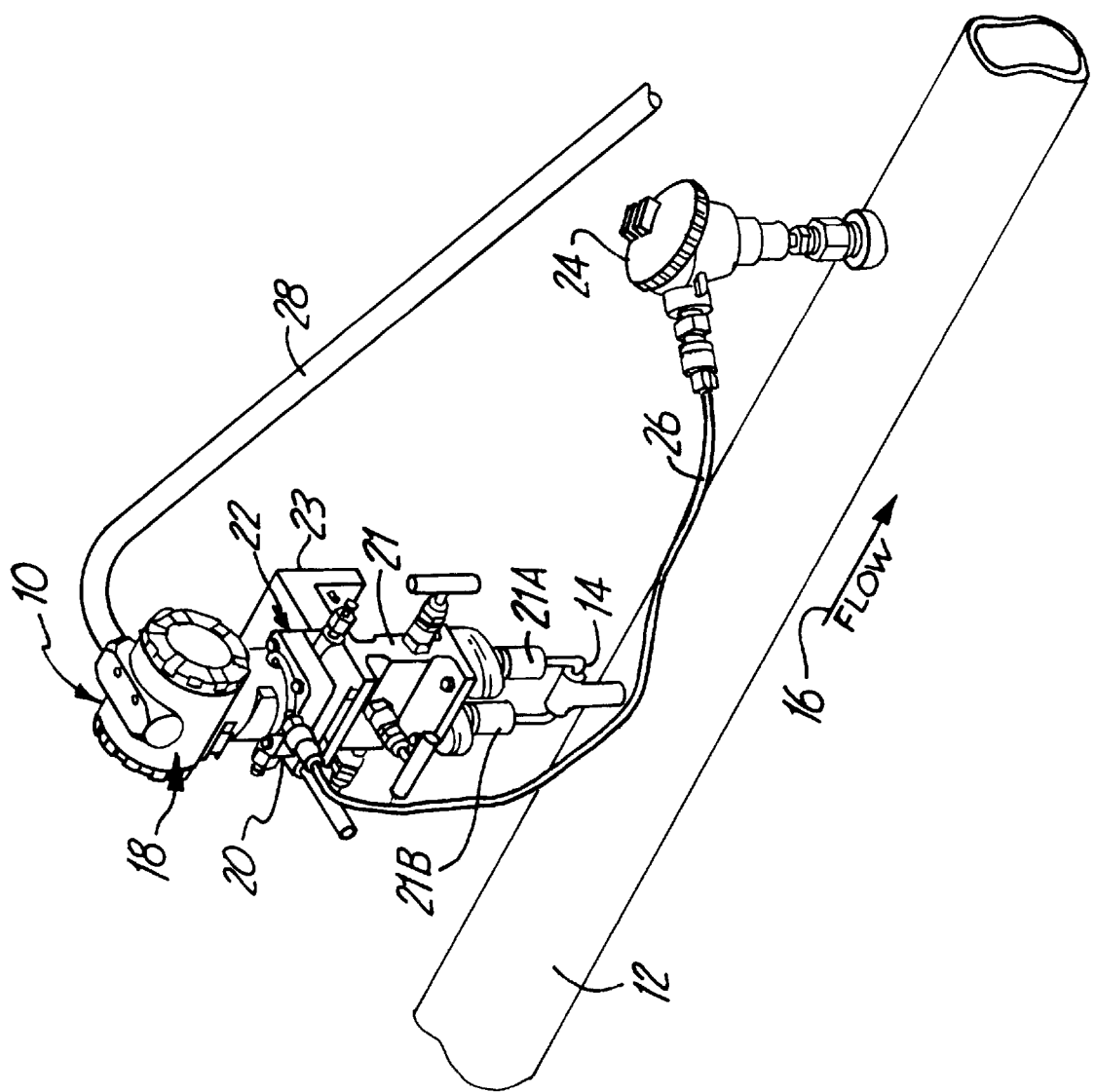

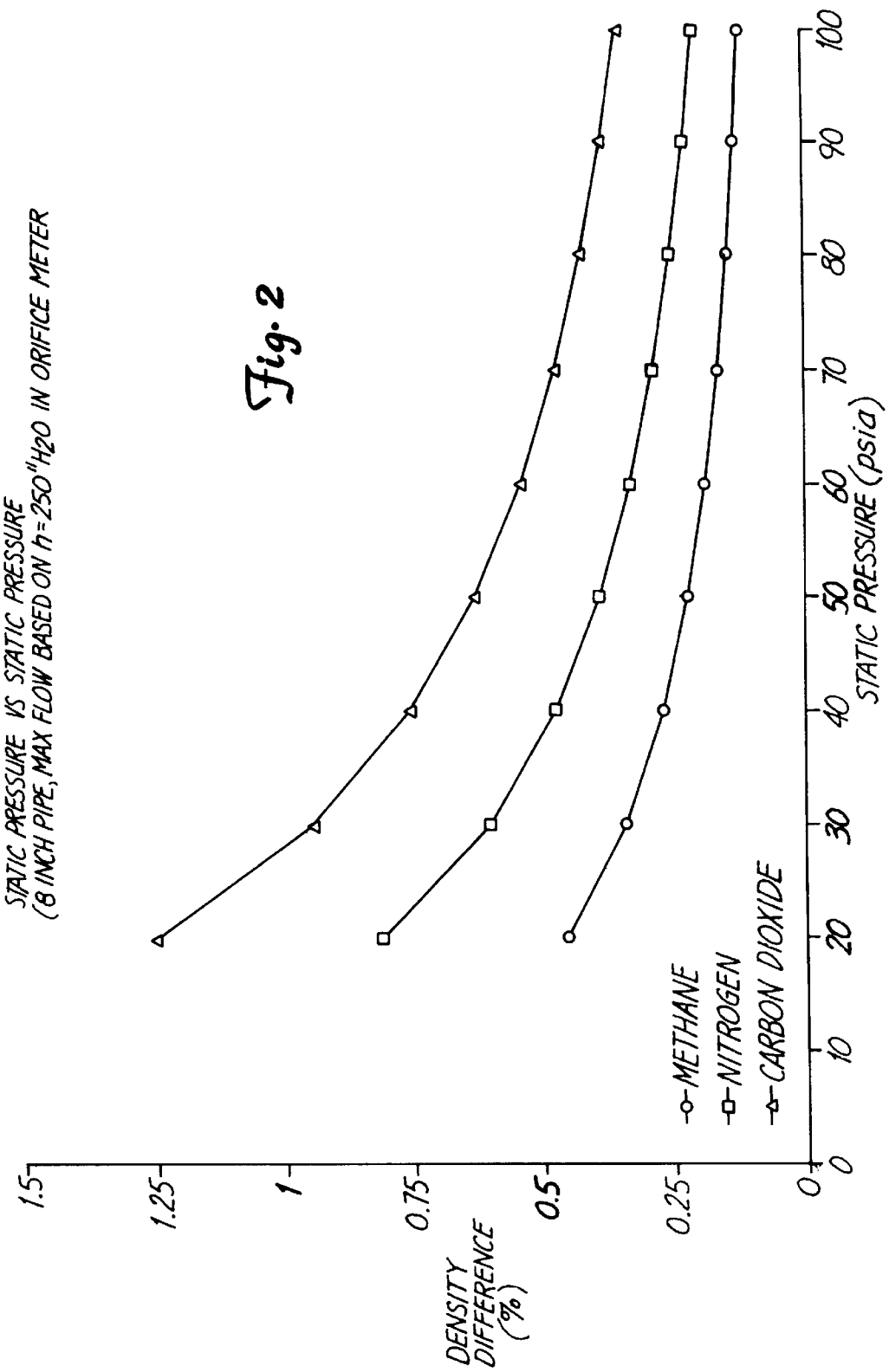

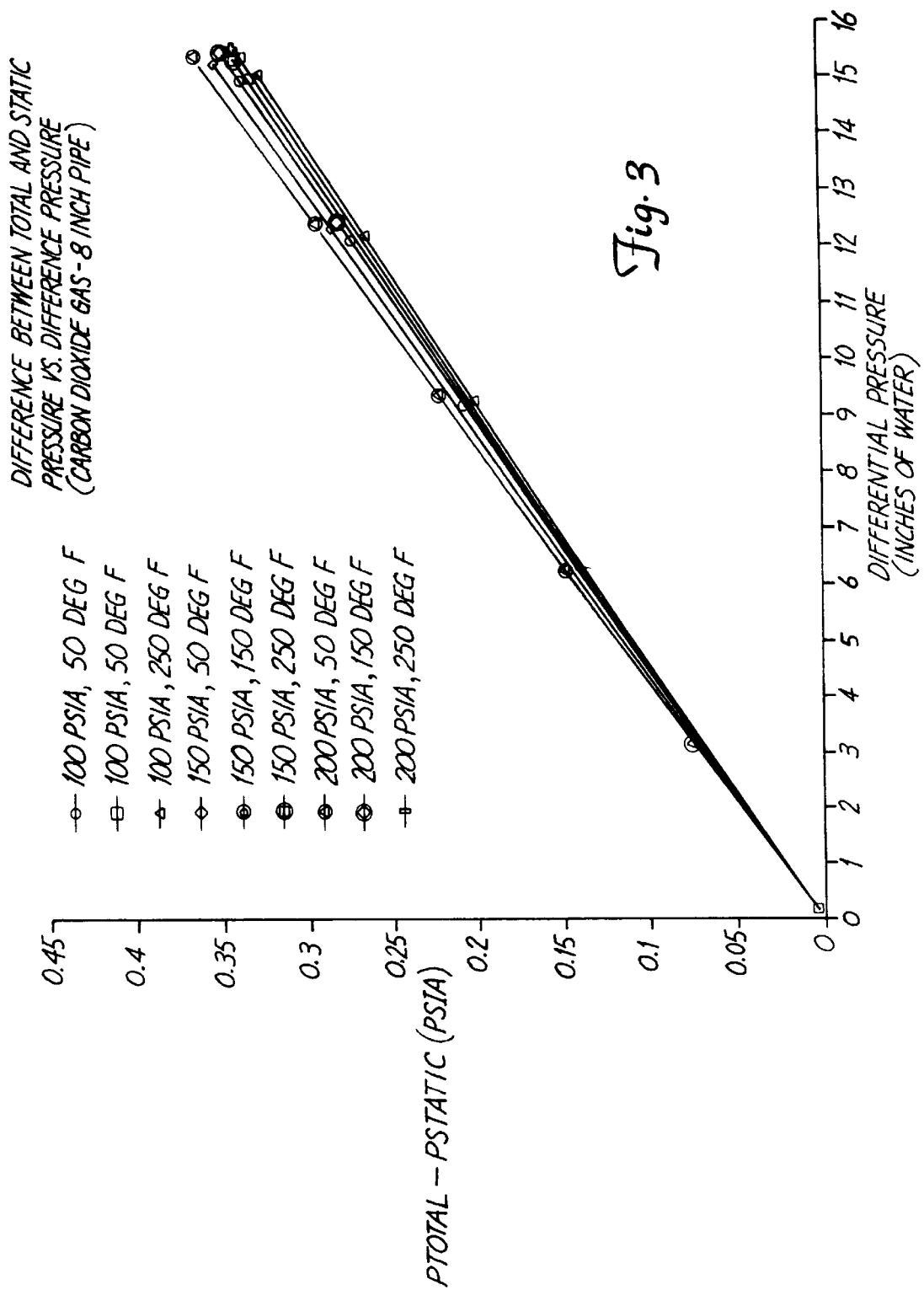

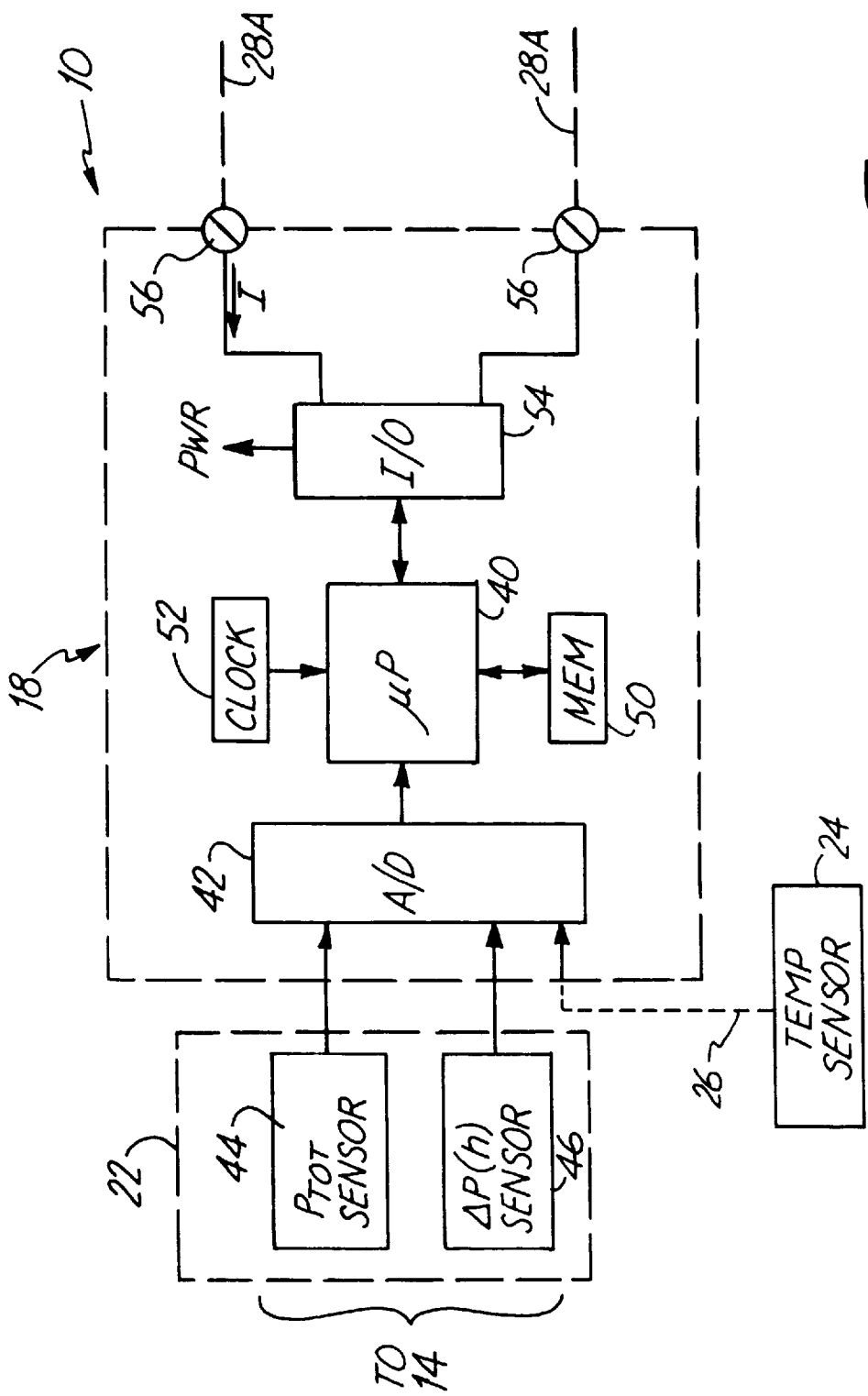

FLOW MEASUREMENT COMPENSATION TECHNIQUE FOR USE WITH AN AVERAGING PITOT TUBE TYPE PRIMARY ELEMENT

BACKGROUND OF THE INVENTION

The present invention relates to measurement of fluid flow. More specifically, the present invention relates to flow measurement of a process fluid using an averaging pitot tube type sensor.

Measurement of flow rate of process fluid is necessary to control industrial processes. In industrial processes, transmitters which measure flow rate (Q) are placed at remote locations in the field of a process control system. These transmitters transmit flow rate information to a control room. The flow rate information is used to control operation of the process. As used herein, process fluid refers to both liquid and gaseous fluids.

One common means of measuring flow rate in the process control industry is to measure the pressure drop across a fixed restriction in the pipe, often referred to as a differential producer or primary element. The general equation for calculating flow rate through a differential producer can be written as:

$$Q = NC_d E Y_1 d^2 \sqrt{\rho h} \qquad \text{Equation 1}$$

where
Q=Mass flow rate (mass/unit time)
N=Units conversion factor (units vary)
$C_d$=Discharge coefficient (dimensionless)
E=Velocity of approach factor (dimensionless)
$Y_1$=Gas expansion factor (dimensionless)
d=Bore of differential producer (length)
$\rho$=Fluid density (mass/unit volume)
h=Differential pressure (force/unit area)

Of the terms in this expression, only the units conversion factor, which is a constant, is simple to calculate. The other terms are expressed by equations that range from relatively simple to very complex. Some of the expressions contain many terms and require the raising of numbers to non-integer powers. This is a computationally intensive operation.

There are a number of types of meters which can be used to measure flow. Head meters are the most common type of meter used to measure fluid flow rates. They measure fluid flow indirectly by creating and measuring a differential pressure by means of an obstruction to the fluid flow. Using well-established conversion coefficients which depend on the type of head meter used and the diameter of the pipe, a measurement of the differential pressure may be translated into a mass or volume rate.

One technique for measuring a differential pressure for determining flow is through an averaging pitot tube type primary element. In general, an averaging pitot tube type primary element for indicating flow consists of two hollow tubes that sense the pressure at different places within the pipe. These tubes can be mounted separately in the pipe or installed together in one casing as a single device. An example of an averaging pitot tube is shown in U.S. Pat. No. 4,154,100, entitled METHOD AND APPARATUS FOR STABILIZING THE FLOW COEFFICIENT FOR PITOT-TYPE FLOWMETERS WITH A DOWNSTREAM-FACING PORT. This design includes a forward facing tube which measures total pressure ($P_{TOT}$). A second tube measures a down stream pressure. The differential pressure between the two tubes is proportional to the square of the flow as given in Equation 2.

$$Q = NKD^2 Y_1 \sqrt{\rho h} \qquad \text{Equation 2}$$

where:
N=Units conversion factor
K=flow coefficient of the averaging pitot (dimensionless)
D=Pipe diameter (inches)
$Y_1$=Gas expansion factor (dimensionless)
$\rho$=Gas density (lb$_m$/ft$^3$)
h=Differential pressure (inches $H_2$)

Accurate calculation of flow based upon pressure measurement requires accurate measurement of density ($\rho$) and the gas expansion factor ($Y_1$) for use in Equation 1. These are calculated with exact equations, look up tables, polynomial approximations or other curve fitting techniques. Accurate determination of density ($\rho$) and the gas expansion factor ($Y_1$) requires an accurate value for the static pressure ($P_{STAT}$) for use in the above techniques. However, the averaging pitot tube type primary element does not sense static pressure. Neither the upstream or downstream facing tube provides an accurate indications of static pressure. In typical prior art transmitters, density ($\rho$) and the gas expansion factor ($Y_1$) are calculated using a separate static pressure ($P_{STAT}$) measurement. For accuracy, this is spaced apart from the averaging pitot tube. This is inconvenient, requires an additional sensor, and requires an additional entry into the process piping.

The additional sensor to sense static pressure ($P_{STAT}$) in the prior art is cumbersome, inconvenient, expensive and provides an additional source of errors.

SUMMARY OF THE INVENTION

The present invention provides a transmitter for measuring mass flow rate (Q) using an averaging pitot tube type primary element. The invention does not require a separate static pressure measurement. A total pressure sensor senses total pressure ($P_{TOT}$) of a process fluid from one pitot tube. A second pressure sensor measures a differential pressure between the tubes of the primary element. Circuitry in the transmitter calculates static pressure ($P_{STAT}$) based upon the total pressure. The calculated static pressure ($P_{STAT}$) is used to calculate fluid density ($\rho$) and the gas expansion factor ($Y_1$). Flow (Q) is calculated based upon the pressure measurements, the fluid density ($\rho$) and the gas expansion factor ($Y_1$).

BRIEF DESCRIPTION OF THE DRAWINGS

FIG. 1A shows a transmitter in accordance with the present invention coupled to a process pipe.

FIG. 2 is a graph showing a comparison of gas density at maximum flow calculated using total pressure and calculated using static pressure versus differential pressure.

FIG. 3 is a graph showing the difference between total pressure and static pressure versus differential pressure for carbon dioxide gas in an 8 inch pipe.

FIG. 5 is a simplified block diagram showing a transmitter for determining flow rate (Q) in accordance with the present invention.

DETAILED DESCRIPTION OF THE PREFERRED EMBODIMENTS

Figure 1B:
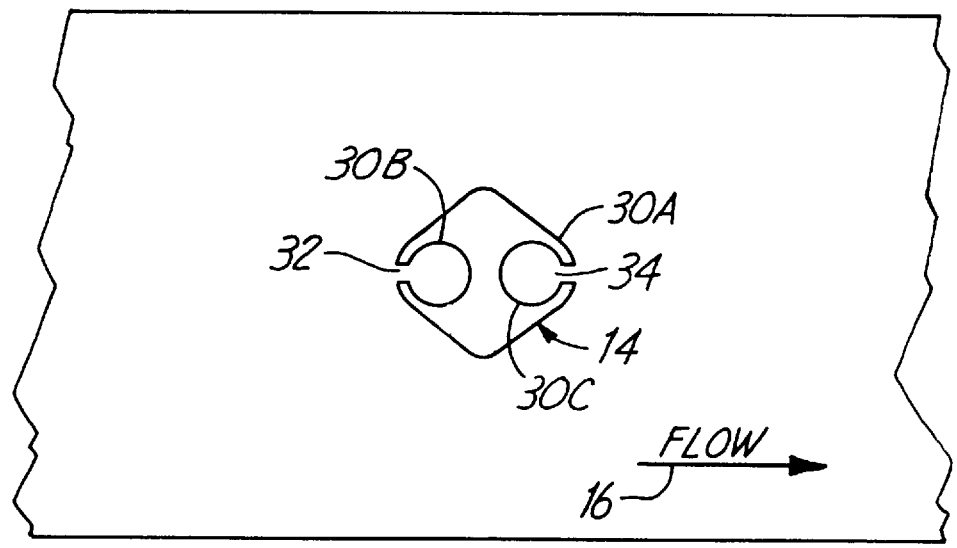
FIG. 1B is a top cross sectional view showing an averaging pitot tube type primary element for use with the present invention.

FIG. 1A is a view of a process control system including a transmitter 10 in accordance with the present invention coupled to process piping 12. Process piping 12 carries process fluid having a velocity (V) and a flow rate (Q). Pipe 12 conducts flow of a fluid, either a gas or a liquid, in the direction indicated by arrow 16.

The present invention does not require a separate measurement of static pressure ($P_{STAT}$) and provides an accurate estimation of the $P_{STAT}$ based upon the total pressure ($P_{TOT}$), which is sensed by the forward facing tube in an averaging pitot tube type primary element, and the differential pressure (h) measured between the two tubes. The estimated static pressure is used in calculations for determining fluid density ($\rho$) and the gas expansion factor ($Y_1$). The technique for estimating static pressure requires less computational time and power than using typical prior art formulas.

Transmitter 10 includes transmitter electronics module 18 and sensor module 22. Transmitter electronics module 18 also preferably includes a boss 20 for accepting an input from a resistive temperature device (RTD), preferably a 100 ohm RTD which is typically inserted directly into the pipe or into a thermowell which is inserted into the pipe to measure the process fluid temperature. The wires from the RTD are connected to one side of a terminal block in a temperature sensor housing 24. The other side of the terminal block is connected to wires which run through tube 26 and are coupled to boss 20.

Sensor module 22 includes a differential pressure sensor for measuring differential pressure (h) and a pressure sensor for measuring total pressure ($P_{TOT}$). The two sensors provide pressure signals which are digitized and provided to a microprocessor. Module 22 connects to primary element 14 through manifold 21 supported by mount 23. The compensated, linearized and digitized signals are provided to the electronics module 18. The electronics module 18 in transmitter 10 provides an output signal indicative of process conditions such as flow rate (Q) of the process fluid flowing through pipe 12 to a remote location, by a 4–20 mA two-wire loop preferably formed using twisted pair conductors, through flexible conduit 28. Further, in accordance with the present invention, transmitter 10 also provides an output signal indicative of flow rate. Transmitter 10 is coupled to primary element 14. Primary element 14 may comprise, for example, a pitot tube such as that shown in U.S. Pat. No. 4,154,100 to Harbaugh et al. issued May 15, 1979, entitled Method And Apparatus For Stabilizing The Flow Coefficient For Pitot-Type Flowmeters With A Downstream-Facing Port.

With other types of primary elements 14 such as orifice plates, nozzles or venturis, the pressure sensed by transmitter 10 is the static pressure ($P_{STAT}$) of the process fluid, for use in calculating the gas density ($\rho$) and the gas expansion factor ($Y_1$) These values are used in calculating the flow rate. In the invention, transmitter 10 is used with an averaging pitot tube type primary element such as that shown in U.S. Pat. No. 4,154,100, and the pressure measured on the upstream side of the pitot tube is an average value of the total, sometimes called stagnation, pressure ($P_{TOT}$) A second tube faces at an angle to the direction of flow such that a differential pressure (h) is developed between the tubes. The total pressure ($P_{TOT}$) is higher than the static pressure ($P_{STAT}$), such that using ($P_{TOT}$) to calculate the gas density and gas expansion factor will result in errors in the flow rate.

Figure 1C:
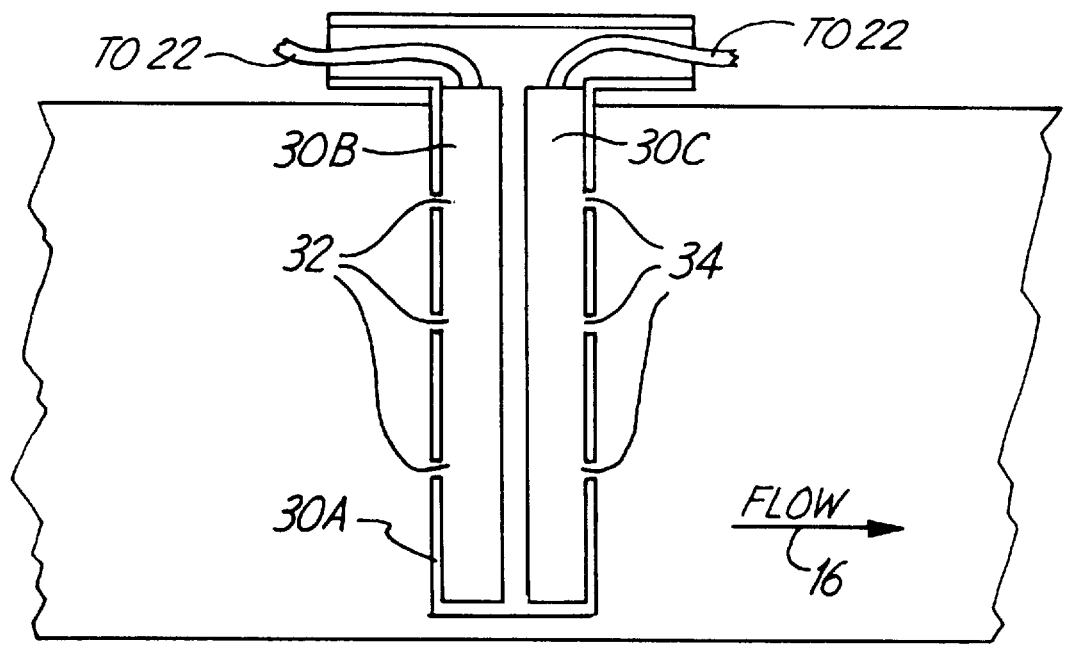
FIG. 1C shows the averaging pitot tube type primary element of FIG. 1B inserted in a process pipe.

FIGS. 1B and 1C show a more detailed view of averaging pitot tube type primary element 14 which penetrates into pipe 12. Element 14 includes an elongated body 30A carrying a forward facing pitot tube 30B and a second, downstream facing pitot tube 30C. Tubes 30B and 30C include a plurality of openings 32 and 34, respectively, distributed along the length of the tubes. The multiple openings ensure that an average pressure is measured across the entire flow 16. Tubes 30B and 30C connect to sensor body 22 of transmitter 10 through piping 21A and 21B and manifold 21.

To illustrate the error in flow calculations when using $P_{TOT}$ as an estimate of $P_{STAT}$, it is instructive to evaluate some examples. The following procedure is used.

1. Assume a pipe size, fluid, pressure and temperature range. The pressure assumed in this step is the static pressure, $P_{STAT}$.
2. Based on the operating ranges, calculate $P_{MIN}$, $P_{MID}$, $P_{MAX}$, and $T_{MIN}$, $T_{MID}$, $T_{MAX}$ to evaluate the performance over the entire range of pressure and temperature.
3. At the nine combinations of P and T from step 2, calculate the flow rates through a reference orifice flow meter at differential pressure ranging from 2.5 to 250 inches $H_2O$.
4. Calculate the exact total pressure $P_{TOT}$ from $P_{STAT}$ using the Equation:

$$P_{TOT} = P_{STAT} \left[ \frac{1}{2} + \sqrt{\frac{1}{4} + \left(\gamma - \frac{1}{2}\gamma\right)\left(\frac{Q}{AP_{STAT}}\right)\left(\frac{R_g T}{g_c}\right)} \right]^{\frac{\gamma}{\gamma - 1}} \quad \text{Equation 3}$$

where:
$P_{TOT}$=Total Pressure (psia)
$P_{STAT}$=Static Pressure (psia)
Q=Mass flow rate ($lb_m$/sec)
A=Area of pipe ($in^2$)
$R_g$=Specific gas constant ($R_u$/Mol Wt)
T=Absolute temperature (°R)
$g_c$=gravitational proportionality constant
γ=ratio of specific heats (isentropic exponent)

Equation 3 relates $P_{TOT}$ and $P_{STAT}$. In addition, the temperature used in the expression is the total temperature. For the purposes of this analysis the temperature measured by an RTD will be assumed to represent the total temperature. For details see "Generalized Flow Across and Abrupt Enlargement" (Benedict, Wyler, Dudek and Gleed, Transactions of ASME, Journal of Power Engineering, July 1976, 327–334) . The total pressure ($P_{TOT}$) calculated using this relationship represents the upstream pressure which would be otherwise measured by the transmitter 10 using tube 30B. The procedure continues:

5. Compare the density calculations using the values of static pressure $P_{STAT}$ and calculated values of total pressure, $P_{TOT}$.
6. Calculate the differential pressure (h) drop across an averaging sensor using Equation 2.

The effect on flow measurement error of using the total pressure ($P_{TOT}$) rather than the static pressure ($P_{STAT}$) is illustrated by evaluating the differences that result when the two pressures are used to calculate the density of gases. This is shown in FIG. 2. The density calculated using the total pressure ($P_{TOT}$) is higher than the density calculated using the static pressure ($P_{STAT}$) . As shown in FIG. 3, the difference increases as the flow rate increases and as the static pressure decreases. FIG. 2 shows a comparison of the maximum error in gas density as a function of static pressure for the three gases used in this analysis. The data was calculated for flow in an 8 inch pipe.

An inspection of the equations 1 and 2 does not readily reveal the relationship between the total pressure ($P_{TOT}$), the static pressure ($P_{STAT}$) and the differential pressure (h). However, if the difference between the total pressure and the static pressure is plotted against differential pressure it is nearly linear (see FIG. 3). It is also fairly insensitive to the static pressure and temperature.

Figure 4:
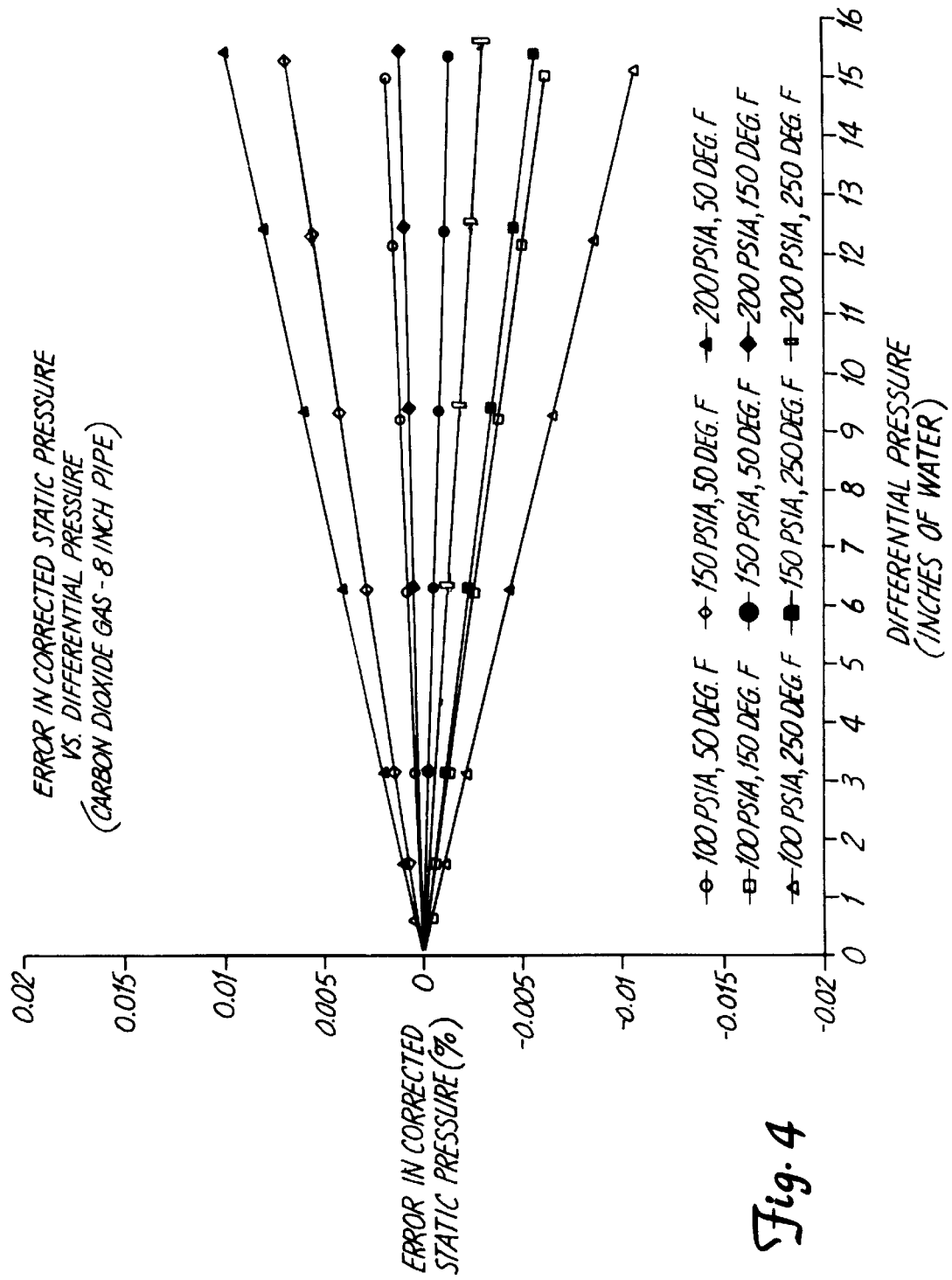
FIG. 4 is a graph showing error in corrected static pressure calculated in accordance with the present invention versus differential pressure for carbon dioxide gas in an 8 inch pipe.

The total pressure ($P_{TOT}$) can be corrected to approximate the static pressure ($P_{STAT}$) by exploiting this nearly linear relationship. Since the total pressure and static pressure converge to the same value at zero flow rate, the relationship between the total pressure and the static pressure can be expressed as:

$$P_{TOT} - P_{STAT} = C_1 h \qquad \text{Equation 4}$$

or $$P_{STAT} = P_{TOT} - C_1 h \qquad \text{Equation 5}$$

where $C_1$ is the average slope over the operating range of pressure and temperature. FIG. 4 shows that the estimation technique of Equation 5 is very accurate in estimating static pressure ($P_{STAT}$), even at large differential pressures (h). In one embodiment, accuracy of the $P_{STAT}$ calculation could be increased by using a polynomial of higher degree in h.

FIG. 5 is a simplified block diagram showing transmitter 10 for implementing the present invention. Transmitter 10 includes microprocessor 40 coupled to analog to digital converter 42. Analog to digital converter 42 connects to pressure sensors 44 and 46 for sensing a pressure ($P_{TOT}$) from tube 30B and a differential pressure (h) from tube 30C, respectively. Sensors 44 and 46 coupled to primary element 14 shown in FIG. 1A. Analog to digital converter 42 also receives a temperature input from temperature sensor 24. Microprocessor 40 operates in accordance with instructions stored in memory 50 at a clock rate determined by clock 52. Memory 50 also stores information for microprocessor 40. Input/output circuitry 54 connects to process control loop 28A through terminal connections 56. Loop 28A carries current I from a remote source of power, which is used by input/output circuitry 54 to generate power for transmitter 10. In one embodiment, transmitter 10 is wholly (or exclusively) powered by loop current I. Information is transmitted over loop 28A by input/output circuitry 54 by controlling the value of current I of control loop 28A. Additionally, input/output circuitry 54 may digitally modulate information onto loop 28A. Transmitter 10 is also capable of receiving instructions over loop 28A. Microprocessor 40 uses the equations discussed above and accurately calculates flow rate (Q) using the total pressure ($P_{TOT}$) to determine fluid density ($\rho$).

The present invention provides an estimated value of static pressure ($P_{STAT}$) based upon the pressure ($P_{TOT}$) and the differential pressure (h) from an averaging pitot tube type primary element. This eliminates the extra sensor in the prior art used to measure static pressure and the extra intrusion into the flow tube.

Although the present invention has been described with reference to preferred embodiments, workers skilled in the art will recognize that changes may be made in form and detail without departing from the spirit and scope of the invention. For example, additional analog-to-digital convertors or microprocessors may also be used to optimize the system. Further, any type of averaging pitot tube primary element may be used. It should also be understood, that the step of calculating static pressure ($P_{STAT}$) may be implemented directly in other equations such as those used to calculate density ($\rho$), the gas expansion factor ($Y_1$) or the flow rate (Q).

What is claimed is:

1. A transmitter for coupling to an averaging pitot tube type primary element introduced into a pipe through a single opening in the pipe having a generally forward facing tube and a second tube, the transmitter calculating flow rate (Q) of process fluid and comprising:

a total pressure sensor for sensing total pressure ($P_{TOT}$) of the process fluid using the generally forward facing tube;

a differential pressure sensor for sensing a differential pressure (h) in the process fluid between the generally forward facing tube and the second tube;

circuitry which calculates flow rate (Q) based upon the total pressure ($P_{TOT}$) the differential pressure (h), fluid density ($\rho$), and the gas expansion factor ($Y_1$) wherein fluid density ($\rho$) and the gas expansion factor ($Y_1$) are calculated as a function of the total pressure ($P_{TOT}$) and differential pressure (h) ; and I/O circuitry for coupling to a process control loop and transmitting the calculated flow rate (Q).

2. The transmitter of claim 1 including circuitry to wholly power the transmitter with power received from the process control loop.

3. The transmitter of claim 1 wherein the calculating circuitry calculates static pressure ($P_{STAT}$) as a function of the total pressure ($P_{TOT}$) and the differential pressure (h), and wherein fluid density ($\rho$) and the gas expansion factor ($Y_1$) of the process fluid are calculated as a function of static pressure ($P_{STAT}$) and thereby as a function of total pressure ($P_{TOT}$).

4. The transmitter of claim 3 wherein a difference between the static pressure ($P_{STAT}$) and the total pressure ($P_{TOT}$) is a linear relation to differential pressure (h).

5. The transmitter of claim 4 wherein static pressure ($P_{STAT}$) is calculated as:

$$P_{TOT} - P_{STAT} = C_1 h$$

where: $C_1$ is a constant.

6. The transmitter of claim 3 wherein the difference between static pressure ($P_{STAT}$) and total pressure ($P_{TOT}$) is calculated based upon a polynomial relation to differential pressure (h).

7. The transmitter of claim 1 including a process fluid temperature sensor coupled to the circuitry which calculates flow rate (Q) and calculation of flow rate (Q) is further based upon process fluid temperature.

8. The transmitter of claim 1 wherein the process control loop is a two wire process control loop.

9. A method for use in a transmitter of determining flow (Q) of a process fluid, comprising:

introducing an averaging pitot tube type primary element into a single opening in the pipe, the pitot tube having a generally forward facing tube and a second tube;

sensing a total pressure ($P_{TOT}$) generated by the forward facing tube of the averaging pitot tube type primary element;

sensing a differential pressure (h) generated by the second tube of the averaging pitot tube type element; and calculating flow rate (Q) based upon static pressure ($P_{STAT}$), total pressure ($P_{TOT}$) and differential pressure (h), wherein static pressure ($P_{STAT}$) is determined based upon total pressure ($P_{TOT}$) and differential. pressure (h).

10. The method of claim 9 including:

calculating fluid density (ρ) based upon the calculated static pressure ($P_{STAT}$) and wherein the step of calculating flow rate (Q) is further based upon fluid density (ρ).

11. The method of claim 9 including:

calculating gas expansion factor ($Y_1$) based upon the calculated static pressure ($P_{STAT}$), and wherein the step of calculating flow rate (Q) is further based upon the gas expansion factor (Y).

12. The method of claim 9 wherein a difference between the static pressure ($P_{STAT}$) and the total pressure ($P_{TOT}$) is a linear relationship to differential pressure (h).

13. The method of claim 12 wherein the linear relationship is:

$$P_{TOT} - P_{STAT} = C_1 h$$

where: $C_1$ is a constant.

14. The method of claim 9 wherein the difference between static pressure ($P_{STAT}$) and total pressure ($P_{TOT}$) is calculated using a polynomial relationship to differential pressure (h).

15. The method of claim 9, including:

transmitting the flow rate (Q) over a process control loop.

16. The method of claim 15 wherein transmitting the flow rate (Q) over a process control loop includes transmitting the flow rate (Q) over a two-wire process control loop.

17. The method of claim 9 including:

measuring temperature of the process fluid; and including the temperature of the process fluid in the step of calculating flow rate (Q).

18. The method of claim 9, including:

coupling the transmitter to a process control loop; and wholly powering the transmitter from the process control loop.

* * * * *

UNITED STATES PATENT AND TRADEMARK OFFICE
CERTIFICATE OF CORRECTION

PATENT NO. : 5,817,950
DATED : October 6, 1998
INVENTOR(S) : David E. Wiklund et al.

It is certified that error appears in the above-identified patent and that said Letters Patent is hereby corrected as shown below:

Col. 5, line 20, Equation 1, change "$P_{TOT}-P_{STAT}-C_1 h$" to --$P_{TOT}-P_{STAT}=C_1 h$--.

Col. 7, line 7, after "$(P_{STAT})$" insert --,--.

Signed and Sealed this

Thirty-first Day of August, 1999

Attest:

Q. TODD DICKINSON

*Attesting Officer*     *Acting Commissioner of Patents and Trademarks*